United States Patent
Courtney (10) Patent No.: US 11,017,128 B2
(45) Date of Patent: May 25, 2021

(54) DATA SECURITY USING BIT TRANSPOSITION DURING MEMORY ACCESSES

(71) Applicant: Seagate Technology LLC, Cupertino, CA (US)

(72) Inventor: Timothy J. Courtney, Longmont, CO (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 15/985,897

(22) Filed: May 22, 2018

(65) Prior Publication Data

US 2019/0362105 A1   Nov. 28, 2019

(51) Int. Cl.
| | |
|---|---|
| *G06F 21/79* | (2013.01) |
| *G06F 21/60* | (2013.01) |
| *G11C 7/10* | (2006.01) |
| *G06F 13/40* | (2006.01) |

(52) U.S. Cl.
CPC .......... *G06F 21/79* (2013.01); *G06F 13/4022* (2013.01); *G06F 21/606* (2013.01); *G11C 7/1006* (2013.01)

(58) Field of Classification Search
None
See application file for complete search history.

(56) References Cited

U.S. PATENT DOCUMENTS

| | | | |
|---|---|---|---|
| 5,442,705 A | 8/1995 | Miyano | |
| 6,061,449 A | 5/2000 | Candelore et al. | |
| 6,950,937 B2 | 9/2005 | Jakobsson et al. | |
| 7,350,085 B2 | 3/2008 | Johnson et al. | |
| 7,548,483 B2* | 6/2009 | Cullum | G11C 7/1012 365/189.02 |
| 7,958,321 B2* | 6/2011 | Kwon | G06F 12/0607 365/63 |
| 8,370,561 B2 | 2/2013 | Sharon et al. | |
| 2007/0291553 A1* | 12/2007 | Kim | G11C 7/1066 365/189.05 |
| 2008/0082798 A1* | 4/2008 | Bloomfield | G06F 9/30032 712/223 |
| 2014/0219444 A1* | 8/2014 | Boehl | G06F 7/582 380/46 |
| 2018/0024920 A1* | 1/2018 | Thomas | G06F 12/0246 711/103 |

* cited by examiner

*Primary Examiner* — Elias Mamo (74) *Attorney, Agent, or Firm* — Hall Estill Attorneys at Law (57) ABSTRACT

Apparatus and method for transferring data between a processing circuit and a memory. In some embodiments, a data storage device has a main non-volatile memory (NVM) configured to store user data from a host device. A controller circuit is configured to direct transfers of the user data between the NVM and the host device. The controller circuit has a programmable processor and a secure data transfer circuit. The secure data transfer circuit executes memory access operations to transfer user data and control values between the processor and a local memory. A memory access operation includes receiving bits of a multi-bit control value on a multi-line bus from the processor, and activating a programmable switching circuit to randomly interconnect different ones of the multi-line bus to transpose the bits in the control value.

20 Claims, 5 Drawing Sheets

FIG. 11

DATA SECURITY USING BIT TRANSPOSITION DURING MEMORY ACCESSES

SUMMARY

Various embodiments are generally directed to data security, and more particularly to the use of bit transposition techniques during data transfers with a memory.

In some embodiments, a method includes steps of providing bits of a multi-bit control value on respective lines of a multi-line bus from a processor circuit associated with a memory access operation with an external memory; activating a programmable switching circuit to randomly interconnect different ones of the multi-line bus to transpose the bits in the control value; and passing the transposed bits to the external memory.

In other embodiments, an apparatus has a programmable processor and an external memory. A secure data transfer circuit is configured to execute a memory access operation to transfer data between the processor and the memory. The memory access operation is carried out by receiving bits of a multi-bit control value on a multi-line bus from the processor, activating a programmable switching circuit to randomly interconnect different ones of the multi-line bus to transpose the bits in the control value, and direct the passing the transposed bits to the memory.

In still further embodiments, a data storage device has a main non-volatile memory (NVM) configured to store user data from a host device. A controller circuit is configured to direct transfers of the user data between the NVM and the host device. The controller circuit has a programmable processor and a secure data transfer circuit. The secure data transfer circuit is configured to execute a memory access operation to transfer data between the processor and a local memory. The operation involves receiving bits of a multi-bit control value on a multi-line bus from the processor, activating a programmable switching circuit to randomly interconnect different ones of the multi-line bus to transpose the bits in the control value, and direct the passing the transposed bits to the local memory.

These and other features and advantages of various embodiments of the present disclosure will be understood from a review of the following detailed description and the accompanying drawings.

DETAILED DESCRIPTION

The present disclosure generally relates to data security, and more particularly to providing secure memory access data transfers between a processing circuit and a memory.

Data security schemes are used to reduce or eliminate access to data by unauthorized users of digital data storage systems. Data security schemes can employ a variety of cryptographic security techniques, such as data encryption and other data security protocols.

Data encryption generally involves the transformation of an input data sequence (plaintext) to an encrypted output data sequence (ciphertext) using a selected encryption algorithm. The encryption algorithm may utilize one or more pieces of auxiliary data, such as encryption keys, to effect the transformation. In this context, plaintext can include data that have been previously encrypted by an upstream encryption process. A symmetric encryption algorithm allows the same encryption algorithm and auxiliary data to subsequently convert the cipher text back to the original plaintext.

Data security protocols more generally deal with maintaining the security of data within a system, such as by establishing symmetric keys, carrying out secret sharing transactions, establishing and verifying connections, authenticating data, generating digital signatures and keyed message digests, etc.

Data storage systems are often configured to implement these and other types of data security schemes in such a way as to reduce the ability of an attacker from gaining access to secured data, as well as gaining access to the various cryptographic methods employed to protect the secured data. For example, many data security systems store encryption keys and other cryptographic function values internally within a system on chip (SOC) integrated circuit device that carries out cryptographic processing. This allows the various values to be maintained internally within the circuit device rather than being exposed on an output bus or other location in the system where the values could be discoverable.

Nevertheless, some security schemes are sufficiently complex as to require the use of external memory separate from an SOC or other processing device to store sensitive data such as cryptographic function values, secure data, and so on. The data and address buses that couple the processing device and memory provide an access point for an attacker to monitor and, in some cases, obtain information sufficient to enable the attacker to attack and defeat the security scheme.

Accordingly, various embodiments of the present disclosure are generally directed to an apparatus and method for providing data security in a data storage system. As explained below, some embodiments provide a processing circuit coupled to a memory. A secure data transfer circuit is configured to perform memory access operations to transfer data between an internal data register of the processing circuit and the memory. The processing circuit and the secure data transfer circuit may be incorporated into a system on chip (SOC) integrated circuit device that communicates with the memory over an external bus.

The secure data transfer circuit is configured to selectively transpose, or scramble, the bits in various control values sent to the memory. The circuit uses entropy from an entropy source to generate an internal mapping arrangement ("switch map") that is maintained in a volatile register. The switch map is used to randomly connect various input pins to output pins of a programmable switching circuit, such as a multiplexor (mux). So long as the switch map is maintained in the volatile register, the switching circuit will maintain the corresponding internal mapping of input pins to output pins.

The memory access operations are carried out by the secure data transfer circuit to transfer data between the memory and the register. During a write operation, an input control value from the processor having multiple bits is transposed by the switching circuit in accordance with the switch map to provide a transposed control value that is thereafter stored in the memory. During a read operation, the transposed control value is retrieved from the memory and the transpositioned of the bit values is reversed by the switching circuit to provide the originally supplied input control value.

The system can be operated in a normal default mode where no bit transpositioning takes place, or a secure mode where bit transpositioning is applied. Each time the secure mode is activated, a different switch map is randomly generated. Data in the memory can be rendered inert by clearing the switch map from the volatile map register.

The bit transpositioning operation can be applied to data bits, address bits or both as desired. While it is contemplated that the memory will be an external non-volatile memory (NVM) such as a NAND flash memory array, other arrangements can be used including a volatile memory (VM) such as a DRAM, etc.

It will be contemplated that the bit transpositioning (scrambling) operation rearranges the order of the bit values, but otherwise maintains the same relative numbers of logical 0s and logical 1s in the output transposed sequence. In further embodiments, combinatorial logic functions can be applied during the bit transpositioning operation, such as one or more bit inversions, exclusive-or (XOR), etc. This can change the relative number of logical 0s and 1s in the output transposed sequence as desired to provide level loading and data whitening.

Figure 1:
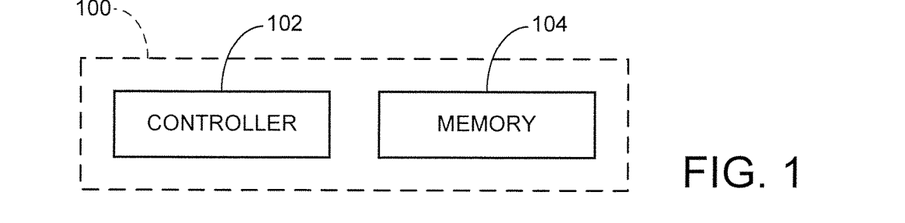
FIG. 1 provides a functional block representation of an exemplary data storage device in accordance with various embodiments.

These and other features and advantages of various embodiments can be understood beginning with a review of FIG. 1 which shows a data storage device 100. The device 100 includes a controller 102 and a memory module 104. The controller 102 takes the form of a hardware circuit and/or a programmable processor circuit that uses executable programming steps in a local memory to provide top level control for the device 100.

The memory module 104 can be arranged as one or more non-volatile memory (NVM) elements such as rotatable recording discs or solid-state memory arrays. The NVM is used as a main store for data supplied by a host device. While a separate controller 102 is shown in FIG. 1, alternative embodiments may incorporate some or all of the controller functions directly into the memory module.

Figure 2:
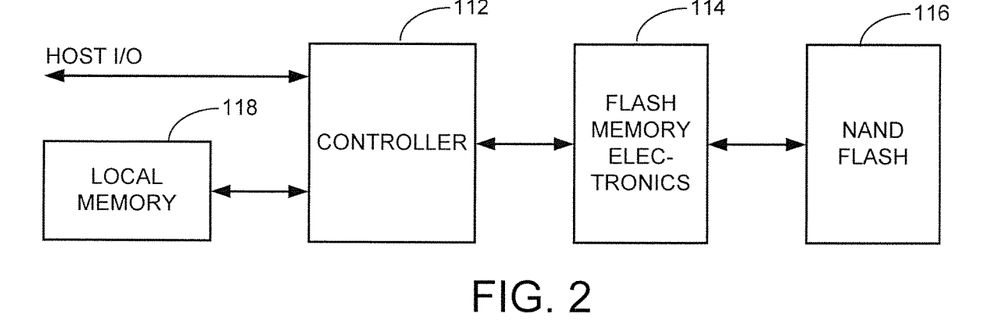
FIG. 2 shows the data storage device of FIG. 1 configured as a solid state drive (SSD) in some embodiments.

FIG. 2 shows a data storage device 110 corresponding to the device 100 of FIG. 1. The device 110 in FIG. 2 is characterized as a solid state drive (SSD) that uses NAND flash as the main memory store. Other configurations for the data storage device 100 can be used including but not limited to a hard disc drive (HDD) that uses rotatable magnetic recording memory or a hybrid data storage device (HDSD) that uses both solid-state semiconductor memory and rotatable magnetic recording memory. Other forms of solid state memory can be used as well, such as rewritable semiconductor memory (e.g., STRAM, RRAM, PLCs, MRAM, etc.).

The SSD 110 includes a top level controller 112 similar to the controller 102 of FIG. 1. In some cases, the controller 112 comprises a front-end processor, a core processor and a back end processor. Each of these processors are configured to execute programming instructions in the form of firmware (FW) stored in a processor memory to direct the storage of data to the main memory store in response to host access (e.g., read and write) commands from the host.

A flash memory electronics (FME) circuit 114 receives commands and data from the controller 112 to store data to a NAND flash array 116. The NAND flash array 116 ("flash") may be arranged as a plurality of dies, each having a separate FME circuit to facilitate parallel processing. The FME 114 and flash 116 may be incorporated into a memory integrated circuit module, and the controller 112 may be integrated into a system on chip (SOC) integrated circuit module that communicates with the flash module.

Local memory 118 is used by the controller 112 during the servicing of the host access commands. The local memory represents one or more external memory devices configured as a temporary storage location for readback data, writeback data, mapping data for the NAND flash, cryptographic control values (e.g., encryption keys), etc. The local memory 118 is external to the SOC so that communications between the SOC and memory are carried out over one or more external busses. The local memory can represent volatile memory such as DRAM, non-volatile memory such as NAND or NOR flash, etc.

Figure 3:
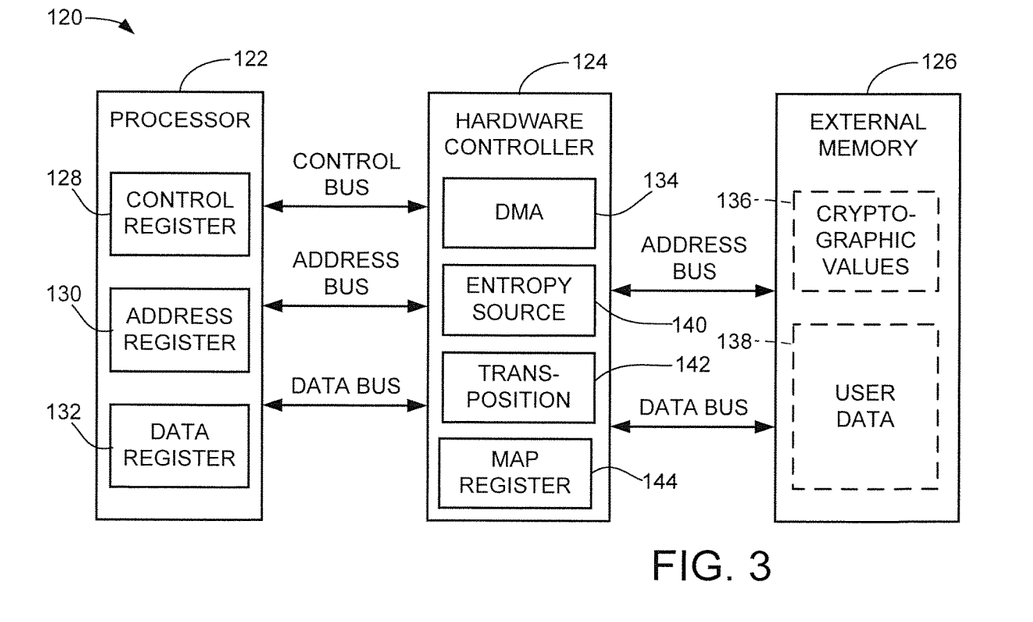
FIG. 3 illustrates a security circuit of the data storage devices of FIGS. 1-2 in accordance with some embodiments.

FIG. 3 shows a security circuit 120 of the data storage devices 100, 110 of FIGS. 1-2 in accordance with some embodiments. Other arrangements can be used. The security circuit 120 includes a programmable processor 122, a hardware controller 124 and an external memory 126. The processor 122 and hardware controller 124 are operative features of the controller 112, and the external memory 126 forms a portion of the local memory 118. The processor 122 (CPU) communicates with the hardware controller 124 via internal control, address and data busses. The hardware controller 124 communicates with the external memory 126 using external address and data busses.

The processor 122 maintains various internal registers 128, 130 and 132 to respectively store control values (e.g., commands and status values), memory address values, and data values. The control values are communicated to the hardware controller 124 to carry out various functions. The memory address values identify addresses (e.g., cache lines) in the external memory 126 at which the various data values are to be stored.

The hardware controller 124, also referred to herein as a secure data transfer circuit, is a hardware circuit with a direct memory access (DMA) module 134 configured to write data to and read data from the memory 126 as commanded by the processor 122. As will be recognized, DMA modules such as 134 are used to offload memory access tasks from a CPU to enable the CPU to perform other tasks during the pendency of the memory access operation (e.g., read, write, etc.). The use of DMA based transfers are particularly suitable, but are not required. Non-DMA forms of memory accesses, including CPU directed accesses and CPU-independent accesses, can be used by the security circuit 120 as desired.

The data that are stored to and retrieved from the memory 126 by the hardware controller 124 can take various forms including cryptographic values 136 used by a cryptographic algorithm executed by the processor, and encrypted or plaintext user data 138 associated with the host device. The cryptographic values 136 can take substantially any form including encryption keys, seed and counter values, hashes, etc.

The secure data transfer circuit 124 incorporates certain data security features as well including an entropy source 140, a transposition circuit 142 and a map register 144, the operation of which will be explained below.

Figure 4:
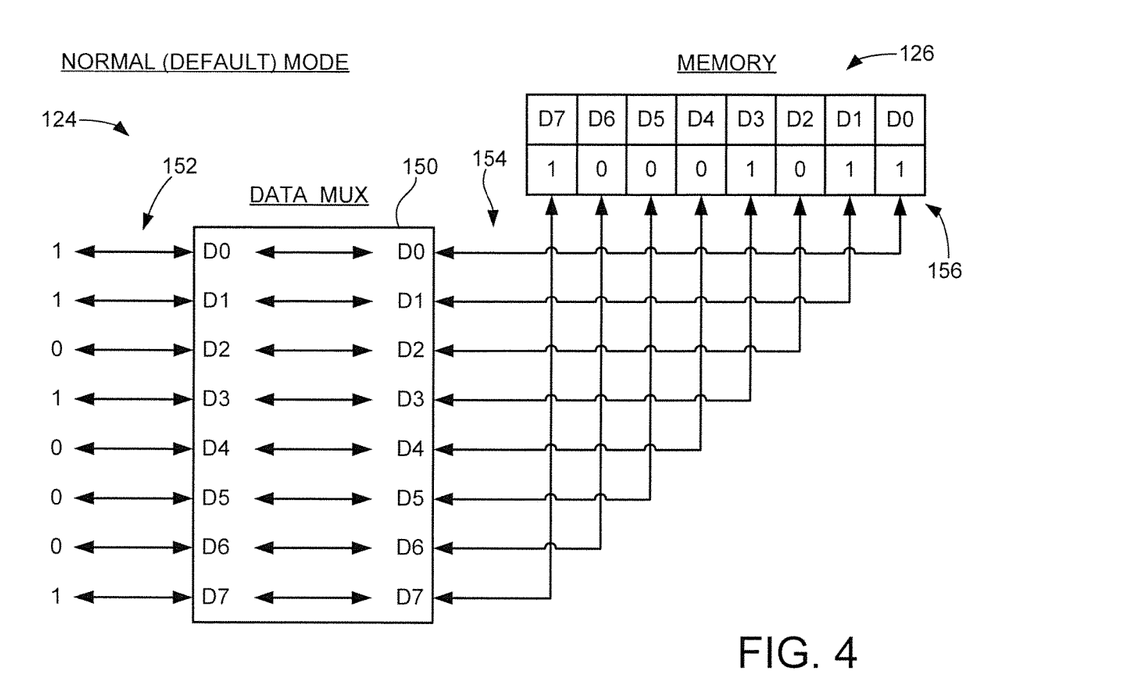
FIG. 4 illustrates operation of the circuit of FIG. 3 during a default mode of operation in which no bit transposition takes place.

FIG. 4 shows aspects of the secure data transfer circuit 124 and the memory 126 in some embodiments. A programmable switch circuit in the form of a data multiplexor (mux) 150 has corresponding input and output pins to transfer data bits between an internal data bus 152 and an external data bus 154. The internal data bus 152 is connected to the processor 122. The external bus 154 is connectable to a cache line 156 in the memory 126. The cache line 156 is identified using a memory address input from the processor.

The data values or words are N-bits in length (in this case, N=8), although other lengths can be used. The data bits are denoted as D0 through D7, with D0 being the least significant bit (LSB) and D7 being the most significant bit (MSB) in the input data word (byte) 10001011.

FIG. 4 shows the circuit 124 to be operated in a normal (default) mode in which no bit transposition takes place. The mux 150 is placed in a pass-through configuration so that each input line of the input bus 152 is directly connected to the corresponding output line in the external bus 154. This results in the writing of the input data word 10001011 to the cache line 156.

Figure 5:
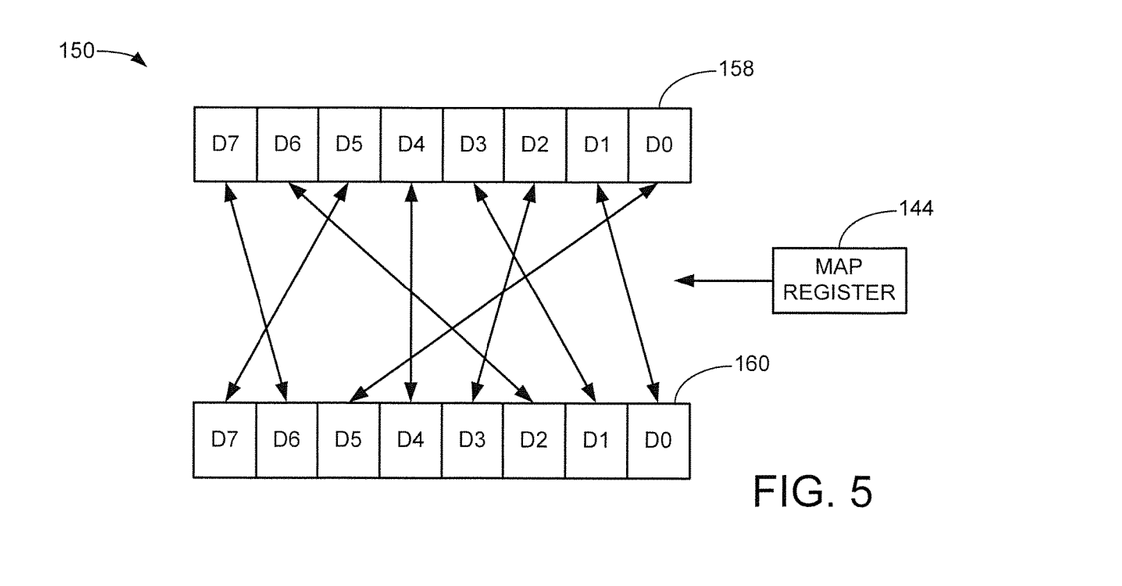
FIG. 5 is a schematic representation of mapping carried out by a programmable multiplexor (mux) of the circuit of FIG. 4.

FIG. 5 shows a schematic representation of the data mux 150 during a secure mode in which bit transposition takes place. The input pins of the mux 150 are denoted at 158, and the output pins are denoted at 160. Internal switching elements within the mux 150 have been arranged using a switch map in the map register 144 of FIG. 3 to change the order of the output bits. The mapping induces a transpositioning, or scrambling, of the respective pins 158, 160 as follows: D7 is now connected to D6; D6 to D2; D5 to D7; D4 remains connected to D4; D3 to D1; D2 to D3; D1 to D0 and D0 to D6.

Figure 6:
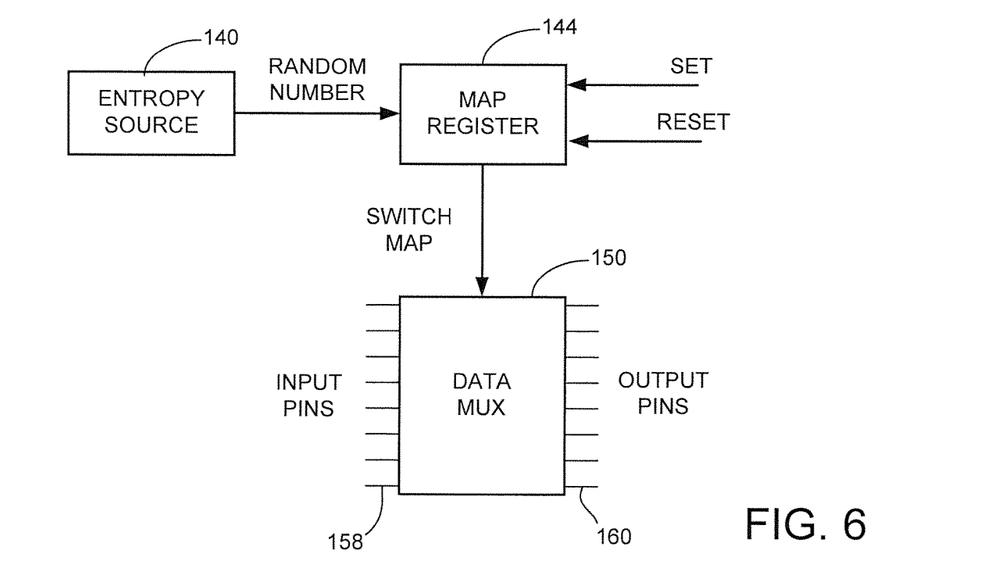
FIG. 6 illustrates aspects of the secure data transfer circuit during operation to implement bit transposition.

FIG. 6 shows how the mapping arrangement of FIG. 5 is randomly established using the entropy source 140 of FIG. 3. The entropy source 140, also sometimes referred to as a random number generator, is a source of low or high entropy (randomness) that is accessed to provide one or more random numbers. Any number of entropy sources are available within a data storage device such as the SSD 110. In one non-limiting example, a ring-oscillator circuit or similar device can be incorporated into the SOC to provide the required entropy. Entropy can be captured, conditioned and stored for later use as required.

The random number is used to form the switch map that randomly associates the output pins 160 to the input pins 158. The switch map is stored in the map register 144 and used to configure the mux 150. Set and reset inputs are used to establish a new switch map and to clear an existing switch map. These inputs are supplied by the processor 122.

FIG. 6 shows the secure data transfer circuit 124 and the memory 126 during the secure mode using the switch map of FIGS. 5 and 6. The processor 122 supplies the input data word 10001011 to the input bus 152 as before. In this case, the programmed mux 150 outputs a transposed data word 00110110 on the output but 154 based on the switch map in the map register 144, and the transposed data word is written to the cache line 156. A subsequent read operation transfers the transposed data word from the memory cache line 156 to the mux 150, which restores the original input data word for use by the processor.

The data words can be safely and securely transferred between the processor 122 and the memory 126 so long as the mux 150 remains programmed in the current state. On the other hand, clearing the switch map from the register 144 immediately renders the data stored in the memory inert, since it is no longer possible to recover the data and perform the necessary transformation to reorder the bits in the original order. Attempting to reset the mux 150 would simply provide a new, randomly chosen switch map which would have no relation to the previous map. Clearing the register 144 thus serves as a secure erasure of that portion of the memory controlled by the register.

Figure 8:
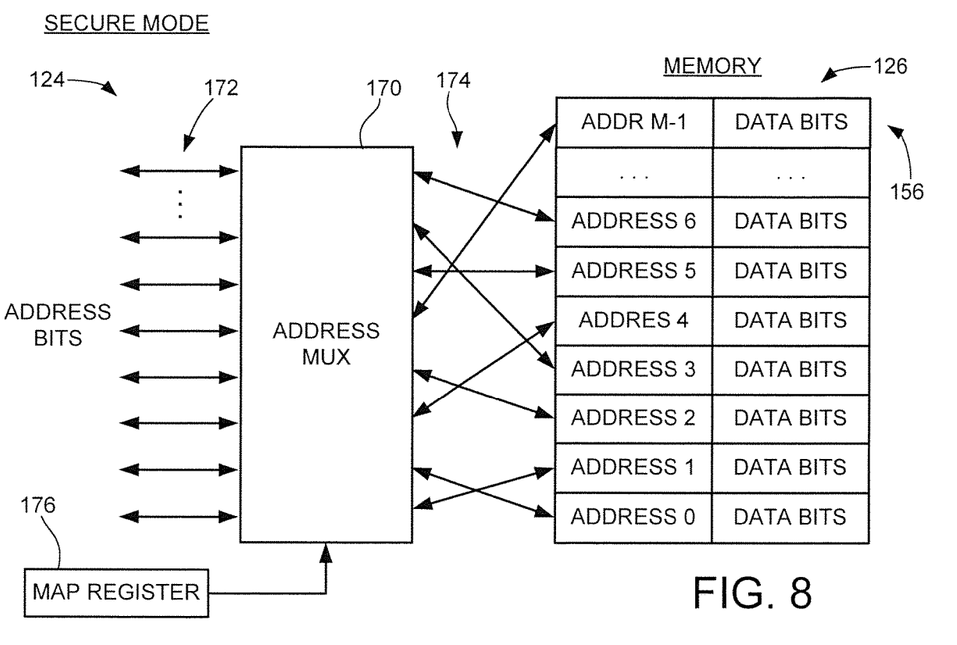
FIG. 8 shows operation of the circuit of FIG. 3 during a secure mode of operation in which bit transposition is applied to address bits.

FIG. 8 shows aspects of the secure data transfer circuit 124 in accordance with further embodiments. In FIG. 8, bit transpositioning is supplied to the address values from the processor 122 so that the various addresses of the cache lines to which data values are stored are scrambled. An address mux 170 receives address values from the processor on an input address bus 172, and output address accesses are represented at 174. A total of M bits, such as 16 bits, can be used for the range of addresses controlled by the mux 150.

An M-bit address is supplied by the processor 122 to the secure data transfer circuit 124 to store a particular N-bit data word at a designated address. As before, the address mux 170 is scrambled using an entropy-derived switch map which is stored in an address map register 176 to program the mux 170 and remap the various output addresses.

It follows that a data value intended to be stored at cache line A will instead be stored at cache line B, and so on. This will be effective over the total range of addresses accessed by the mux 170. A subsequent request for the data at cache line A will provide the data from cache line B. Clearing the address map register 176 clears the switch map. While the data values may still be stored in the various cache lines, the actual addresses at which the various data values are stored will become unknown.

Figure 7:
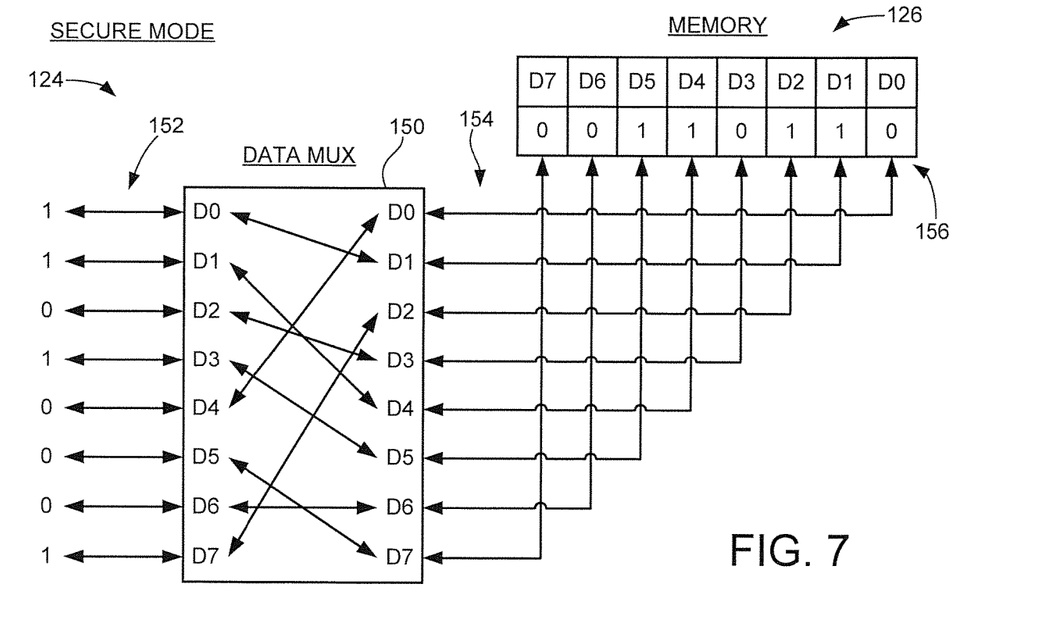
FIG. 7 shows operation of the circuit of FIG. 3 during a secure mode of operation in which bit transposition is applied to data bits.

Address transpositioning can be useful with certain types of data such as programming instruction sets, large data values (e.g., encryption keys) etc. In some embodiments, both address transposition as shown in FIG. 8 and data value transposition as shown in FIG. 7 can be applied to a set of data stored in the memory 126.

At this point it will be appreciated that the transpositioning of address and data bit values described thus far maintains the same amount of entropy in the output values; that is, for a given input multi-bit value, the output transposed value will maintain the same respective numbers of logical 0s and logical 1s as the input value. The respective bits are simply maintained in a different order. For a 32 byte encryption key, using this technique would provide about $2.6 \times 10^{35}$ different possible data bit mappings. Maintaining the same level of entropy as the original data is thus believed to be effective in protecting against attacks.

Figure 9:
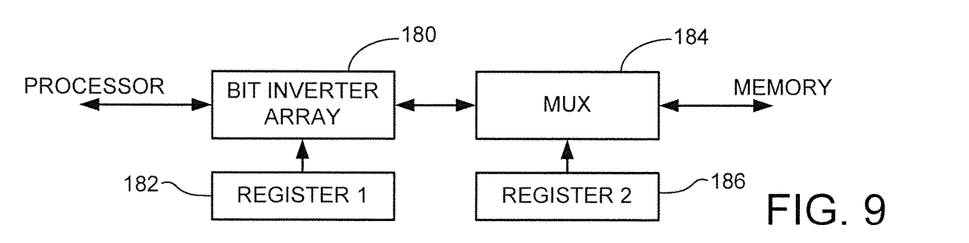
FIG. 9 shows additional aspects of the circuit of FIG. 3 in accordance with further embodiments.

Further embodiments can implement combinatorial logic functions to change this ratio and increase the entropy in the output transposed data. An example is shown in FIG. 9 which provides a bit inverter array 180 that can apply a bit inversion to one or more bits in the input value. The inverted bits are managed by an inversion map supplied in a first register 182. Once inverted, the processed value is supplied to a selected mux 184 (such as the muxs 150, 170) which provides bit reordering using a switch map in a second register 184 (such as the map registers 144, 176). Other combinatorial functions can be applied, such as exclusive-or (XOR), etc. This can provide further levels of data security and can bring the ratio of logical 0s and 1s to a desired ratio (such as nominally 50-50%).

Figure 10:
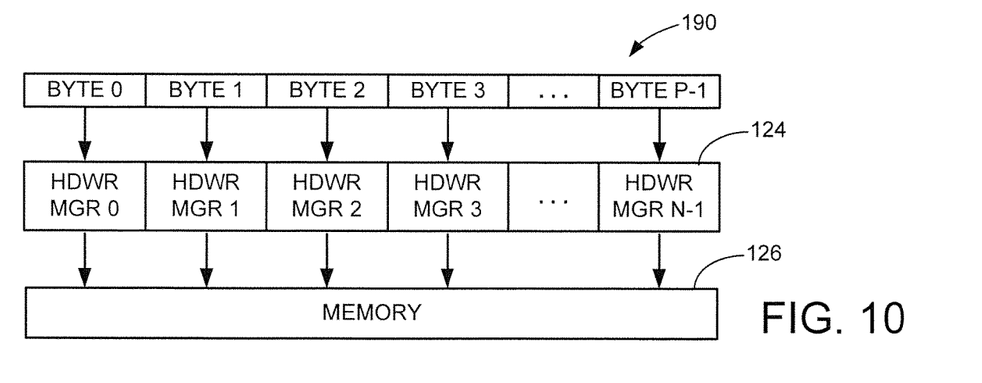
FIG. 10 illustrates an array of hardware manager circuits configured in a manner corresponding to FIG. 3 to process data transposition operations in parallel for multi-bit values.

It is contemplated that an array of hardware manager circuits 124 can be arranged to manage multi-byte values supplied to the memory. FIG. 10 shows a P-byte data word 190, such as a 64 byte encryption key, that is subjected to bit transposition at an individual byte level by N manager circuits 124. Each circuit operates as described above to transpose the respective bits in each byte. In some cases, only a selected subset of the hardware circuits 124 can be activated while still providing a scrambled output since an attacker will not be able to determine which sequences are scrambled and which are not.

Figure 11:
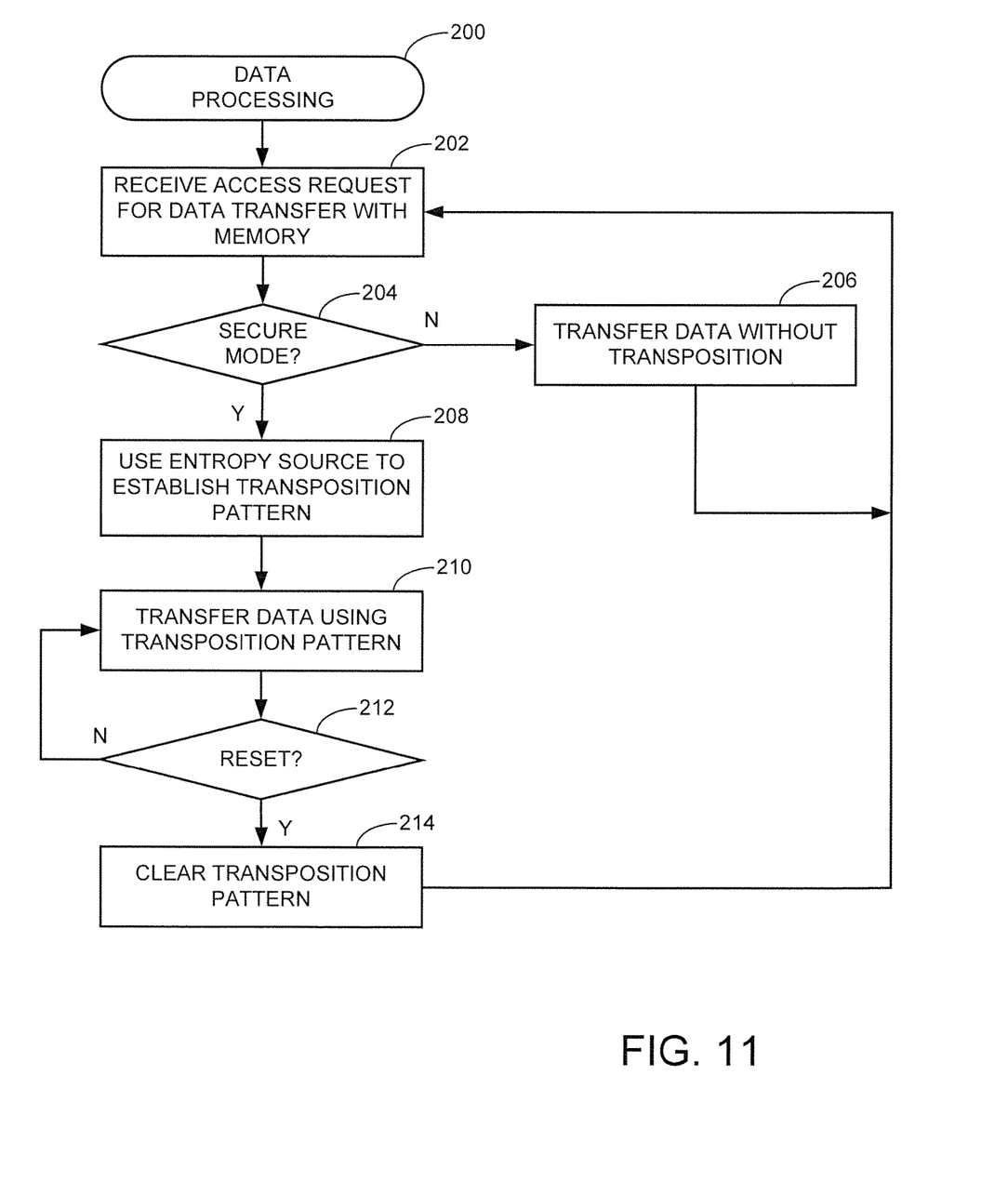
FIG. 11 is a data processing routine illustrative of steps that may be carried out by the data storage devices of FIGS. 1-2 in some embodiments.

FIG. 11 is a flow chart for a data processing routine 200 carried out in accordance with various embodiments in accordance with the foregoing discussion by the exemplary security circuit 120 of FIG. 3. An access request is received at step 202 to transfer selected data to a selected address in a memory location. Step 204 determines whether secure mode is to be applied during the transfer. If not, a normal transfer is carried out, step 206.

If secure mode is selected, the flow passes to step 208 where an entropy source is accessed to establish a transposition pattern (switch map). The transposition pattern is applied to a multi-bit control value associated with the request to provide a transposed control value which is thereafter used during the access, step 210. As noted above, the transposed control value may be data values, address values or both.

Decision step 212 determines whether a reset command has been issued to reset the system. If not, the secure data transfer circuit 124 maintains the current programming of the mux circuit(s) to enable data transfers between the processor 122 and memory 126.

When a reset command is received, the flow passes to step 214 where the transposition pattern is cleared, such as by clearing out the contents of the associated map register and removing the switching configuration of the associated mux or other switch circuit.

The foregoing embodiments are suitable for use with both volatile and non-volatile memories. Using a non-volatile memory (e.g., NAND flash) and configuring the map register(s) as volatile registers will ensure that the switch maps will be automatically cleared upon a loss of power, thereby securely erasing the contents of the NAND flash. However, the system may be configured such that the contents of the map register(s) are retained even in the event of a power loss, so that a specific command is required from the processor 122 to reset the scrambling circuitry.

The contents of a volatile external memory, such as a DRAM, would tend to be lost upon a loss of power to the system; nevertheless, it still may be useful to implement the various embodiments with a volatile external memory since an attacker would not be able to easily discern the memory contents transferred to the memory during operation using a bus monitor or other equipment.

While the various embodiments have been described in the context of a data storage device, it will be appreciated that this is not limiting as the circuits and methods are readily adaptable for other environments such as local or remote data transfers over a network in a communication system, etc.

It will now be understood that even though numerous characteristics and advantages of various embodiments of the present disclosure have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. A method comprising:
providing bits of a multi-bit control value in a first order on respective lines of a multi-line bus from a processor circuit associated with a memory access operation with an external memory, the memory access operation associated with a transfer of user data between the external memory and a local memory;
generating a random number;
activating a programmable switching circuit to randomly interconnect different lines of the multi-line bus to transpose the bits in the control value to a different, second order in relation to the random number; and
passing the transposed bits in the second order to the external memory to store the user data in the external memory in physical locations within the external memory that are arranged within the external memory responsive to the random number.

2. The method of claim 1, wherein the multi-bit control value is a data word to be stored in the memory during the memory access operation, wherein the processor circuit processes the data word with the bits in the first order, and wherein the external memory stores the data word with the bits in the second order.

3. The method of claim 1, wherein the multi-bit control value is an address in the memory at which a data word is to be stored during the memory access operation, wherein the processor circuit requests the data word from a first address of the external memory corresponding to the bits in the first order, and wherein the external memory stores the data word at a different, second address of the external memory corresponding to the bits in the second order.

4. The method of claim 1, wherein the random number is generated by obtaining entropy from an entropy source, wherein the random number comprises a sequence of random bits used to establish a switch map, and the switching circuit is programmed using the switch map to randomly interconnect output pins of the switching circuit to input pins of the switching circuit.

5. The method of claim 4, wherein the switch map is stored in a map register coupled to the switching circuit.

6. The method of claim 5, wherein the map register is configured as a volatile register, the external memory is a non-volatile memory, and wherein the method further comprises performing a secure erasure of the transposed bits in the external memory by clearing the switch map from the register to reset internal switching paths within the programmable switching circuit.

7. The method of claim 1, wherein the multi-line bus is an internal bus coupled between the processor and the programmable switching circuit, and wherein the programmable switching circuit randomly interconnects the different lines of the internal bus to different lines of an external bus coupled between the programmable switching circuit and the external memory.

8. The method of claim 1, wherein the external memory is a volatile memory.

9. An apparatus comprising:
a programmable processor;

an external memory;
a random number generator configured to generate a multi-bit random number; and
a secure data transfer circuit configured to execute a memory access operation to transfer data between the processor and the external memory by receiving bits of a multi-bit control value on a first multi-line bus from the processor, activating a programmable switching circuit to randomly interconnect different lines of the first multi-line bus to different lines of a second multi-line bus coupled to the memory to transpose the bits in the control value in relation to the multi-bit random number, and direct the passing of the transposed bits to the external memory along the second multi-line bus to store the user data in the external memory in physical locations within the external memory that are arranged within the external memory responsive to the random number.

10. The apparatus of claim 9, wherein the programmable processor and the secure data transfer circuit are incorporated into a system on chip (SOC) integrated circuit device, and the memory is coupled to the SOC using an external data bus.

11. The apparatus of claim 9, wherein the secure data transfer circuit comprises an entropy source, a map register and a programmable switching circuit, the map register configured to store a switch map to program the programmable switching circuit to randomly associate output pins of the programmable switching circuit with input pins of the programmable switching circuit responsive to entropy obtained from the entropy source.

12. The apparatus of claim 11, wherein the processor is further configured to implement a secure erasure of data stored by the memory by resetting the programmable switching circuit through application of a reset signal to the map register to clear the switch map.

13. The apparatus of claim 9, wherein the external memory comprises flash memory.

14. The apparatus of claim 9, wherein the external memory comprises DRAM.

15. The apparatus of claim 9, wherein the first multi-line bus is a first data bus, the second multi-line bus is a second data bus, and the multi-bit control value is an input data word to be stored to the memory having N-bits in an initial order across N lines of the first data bus, and wherein the programmable switching circuit transposes the bits in the input data word to provide a different, transposed N-bit data word with the bits in a different order across the N lines of the second data bus, the transposed N-bit data word stored to a selected cache line in the memory.

16. The apparatus of claim 15, wherein the first multi-line bus is a first address bus and the second multi-line bus is a second address bus, the processor concurrently transfers an address on the first address bus to the secure data transfer circuit as part of the memory access operation, the address having M-bits in an initial order across M lines of the first address bus, wherein the programmable switching circuit further transposes the M-bits in the address to provide a different, transposed M-bit address across the M lines of the second address bus, and wherein the transposed N-bit data word is stored at the different, transposed M-bit address in the memory.

17. The apparatus of claim 9, wherein the multi-bit control value is an address of a cache line in the memory, the address having M-bits in an initial order, and wherein the programmable switching circuit transposes the M-bits in the address to provide a different, transposed M-bit address using the random number, and wherein an input data word from the processor is stored at the different, transposed M-bit address in the memory.

18. A data storage device, comprising:
a main non-volatile memory (NVM) configured to store user data from a host device;
an entropy source configured to generate a random number;
a local memory; and
a controller circuit configured to direct transfers of the user data between the NVM and the host device, the controller circuit comprising a programmable processor and a secure data transfer circuit configured to execute a memory access operation to transfer data between the processor and the local memory by receiving bits of a multi-bit control value on an internal multi-line bus from the processor, activating a programmable switching circuit to randomly interconnect different lines of the internal multi-line bus to different lines of an external multi-line bus coupled to the external memory to transpose the bits in the control value in relation to a bit sequence of the random number, and direct the passing of the transposed bits to the local memory using the external multi-line bus to store the user data in the external memory in physical locations within the external memory that are arranged within the external memory responsive to the random number.

19. The data storage device of claim 18, wherein the controller circuit is configured as a system on chip (SOC) integrated circuit device and the local memory is coupled to the SOC using the external multi-line bus.

20. The data storage device of claim 18 characterized as a solid state drive (SSD), wherein the NVM comprises NAND flash and the local memory is at least a selected one of volatile memory or non-volatile memory.

* * * * *